US012573306B2

(12) United States Patent
Lamb et al.

(10) Patent No.: US 12,573,306 B2
(45) Date of Patent: Mar. 10, 2026

(54) TAXIING METHOD AND APPARATUS

(71) Applicant: BAE SYSTEMS plc, London (GB)

(72) Inventors: Philip Lamb, Rochester (GB); James Harrison, Rochester (GB); Antony Kershaw, Rochester (GB)

(73) Assignee: BAE SYSTEMS PLC, London (GB)

( * ) Notice: Subject to any disclaimer, the term of this patent is extended or adjusted under 35 U.S.C. 154(b) by 316 days.

(21) Appl. No.: 17/753,646

(22) PCT Filed: Sep. 10, 2020

(86) PCT No.: PCT/GB2020/052175
§ 371 (c)(1),
(2) Date: Mar. 10, 2022

(87) PCT Pub. No.: WO2021/053320
PCT Pub. Date: Mar. 25, 2021

(65) Prior Publication Data
US 2022/0335845 A1 Oct. 20, 2022

(30) Foreign Application Priority Data
Sep. 17, 2019 (GB) ..................................... 1913372

(51) Int. Cl.
*G08G 5/51* (2025.01)
*B64D 43/02* (2006.01)
(Continued)

(52) U.S. Cl.
CPC .............. *G08G 5/51* (2025.01); *B64D 43/02* (2013.01); *G01C 23/005* (2013.01); *G08B 7/06* (2013.01);
(Continued)

(58) Field of Classification Search
None
See application file for complete search history.

(56) References Cited

U.S. PATENT DOCUMENTS 4,477,043 A * 10/1984 Repperger ............. G05G 9/047
244/230
6,571,166 B1 5/2003 Johnson et al.
(Continued)

FOREIGN PATENT DOCUMENTS

FR 3028085 A1 5/2016
FR 3031830 A1 * 7/2016 .......... G08G 5/0013
(Continued)

OTHER PUBLICATIONS

"Active controls for commercial aircraft ground operations" by UM Newspoint, Jul. 31, 2019, available at: https://www.um.edu.mt/newspoint/news/features/2019/07/activecontrolsaircraft) (retrieved Mar. 14, 2024) (Year: 2019).*
(Continued)

*Primary Examiner* — Adam D Tissot
*Assistant Examiner* — Charles Pall
(74) *Attorney, Agent, or Firm* — Finch & Maloney PLLC

(57) ABSTRACT

A method for assisting a pilot to navigate an aircraft when taxiing is disclosed. A centre line of a route, conformal to outside scenery, is displayed on an eyes out screen associated with the pilot. A pictorial indication of the alignment of the undercarriage with the centre line is displayed on the eyes out screen. Further graphical information related to the navigation is displayed on the eyes out screen.

16 Claims, 12 Drawing Sheets

(51) Int. Cl.

| | | |
|---|---|---|
| *G01C 23/00* | (2006.01) |
| *G08B 7/06* | (2006.01) |
| *G08G 5/21* | (2025.01) |
| *G08G 5/50* | (2025.01) |
| *G08G 5/55* | (2025.01) |
| *G08G 5/72* | (2025.01) |

(52) U.S. Cl.
CPC ................. *G08G 5/21* (2025.01); *G08G 5/50* (2025.01); *G08G 5/55* (2025.01); *G08G 5/723* (2025.01)

(56) References Cited

U.S. PATENT DOCUMENTS

| | | | |
|---|---|---|---|
| 7,382,284 B1 | 6/2008 | Armstrong et al. | |
| 7,564,372 B1 | 7/2009 | Bailey et al. | |
| 8,560,149 B1 * | 10/2013 | Ganguli | G05D 1/0083 |
| | | | 701/15 |
| 9,189,964 B1 | 11/2015 | Rathinam et al. | |
| 2007/0168111 A1 * | 7/2007 | Dubourg | B64F 1/002 |
| | | | 701/16 |
| 2008/0191903 A1 * | 8/2008 | Dubourg | G05D 1/0083 |
| | | | 340/958 |

| | | | |
|---|---|---|---|
| 2010/0250030 A1 * | 9/2010 | Nichols | G08G 5/55 |
| | | | 701/3 |
| 2010/0292912 A1 | 11/2010 | Palanichamy et al. | |
| 2015/0084793 A1 * | 3/2015 | Khatwa | G08G 5/51 |
| | | | 340/969 |
| 2016/0179327 A1 * | 6/2016 | Zammit-Mangion | |
| | | | G05D 1/101 |
| | | | 701/3 |

FOREIGN PATENT DOCUMENTS

| | | |
|---|---|---|
| GB | 2569601 A | 6/2019 |
| WO | 2021053320 A1 | 3/2021 |

OTHER PUBLICATIONS

English translation of FR-3031830-A1 (Year: 2025).*

International Search Report and Written Opinion received for PCT Application No. PCT/GB2020/052175. Mail date: Dec. 9, 2020. 12 pages.

GB Search Report under Section 17(5) received for GB Application No. 1913372.7, dated Feb. 20, 2020. 4 pages.

International Preliminary Report on Patentability received for PCT/GB2020/052175. Mail Date: Mar. 31, 2022. 7 pages.

* cited by examiner

Figure 5:
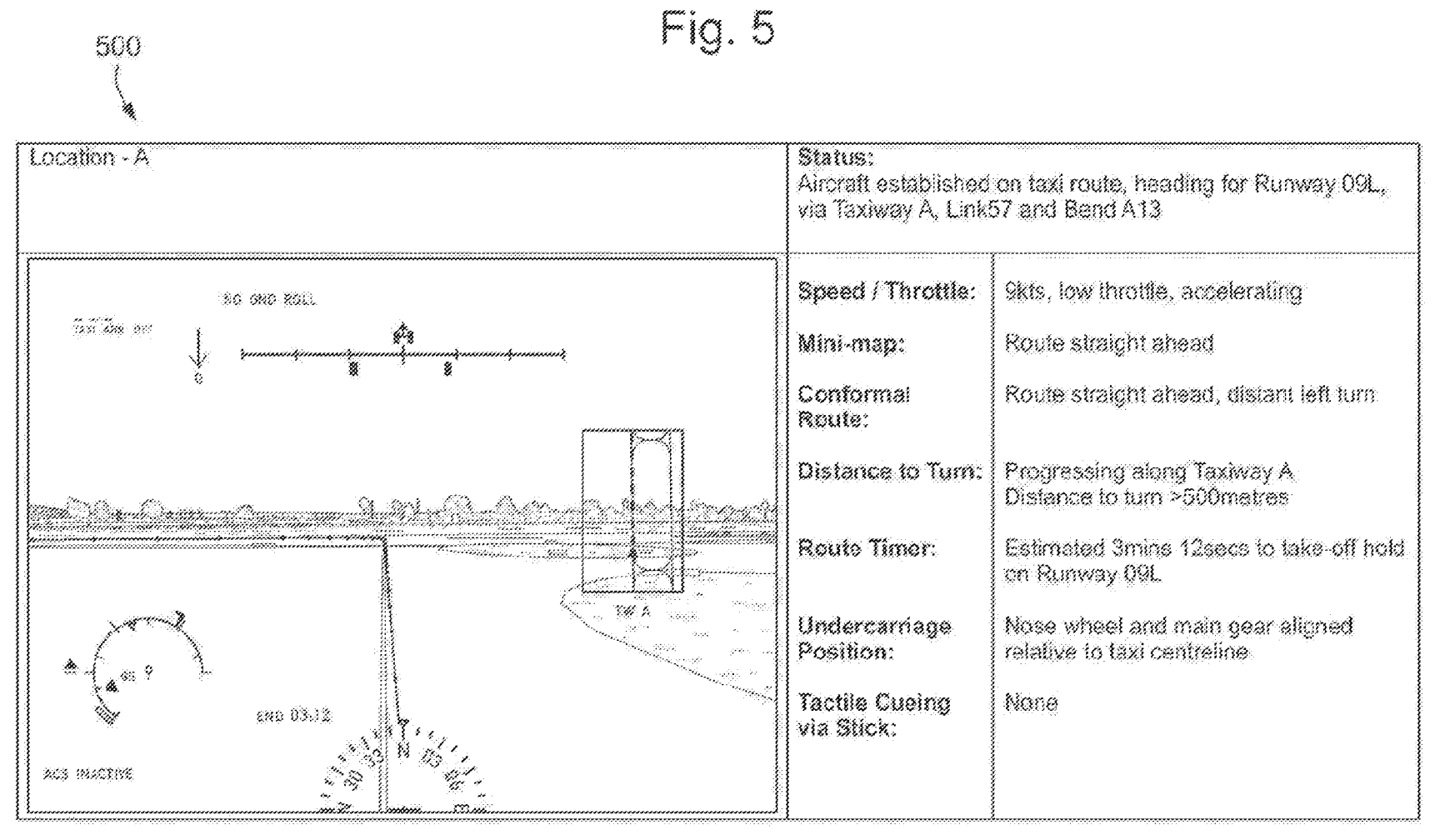

Location - A

Status:
Aircraft established on taxi route, heading for Runway 09L, via Taxiway A, Link57 and Band A13

| | |
|---|---|
| Speed / Throttle: | 9kts, low throttle, accelerating |
| Mini-map: | Route straight ahead |
| Conformal Route: | Route straight ahead, distant left turn |
| Distance to Turn: | Progressing along Taxiway A Distance to turn >500metres |
| Route Timer: | Estimated 3mins 12secs to take-off hold on Runway 09L |
| Undercarriage Position: | Nose wheel and main gear aligned relative to taxi centreline |
| Tactile Cueing via Stick: | None |

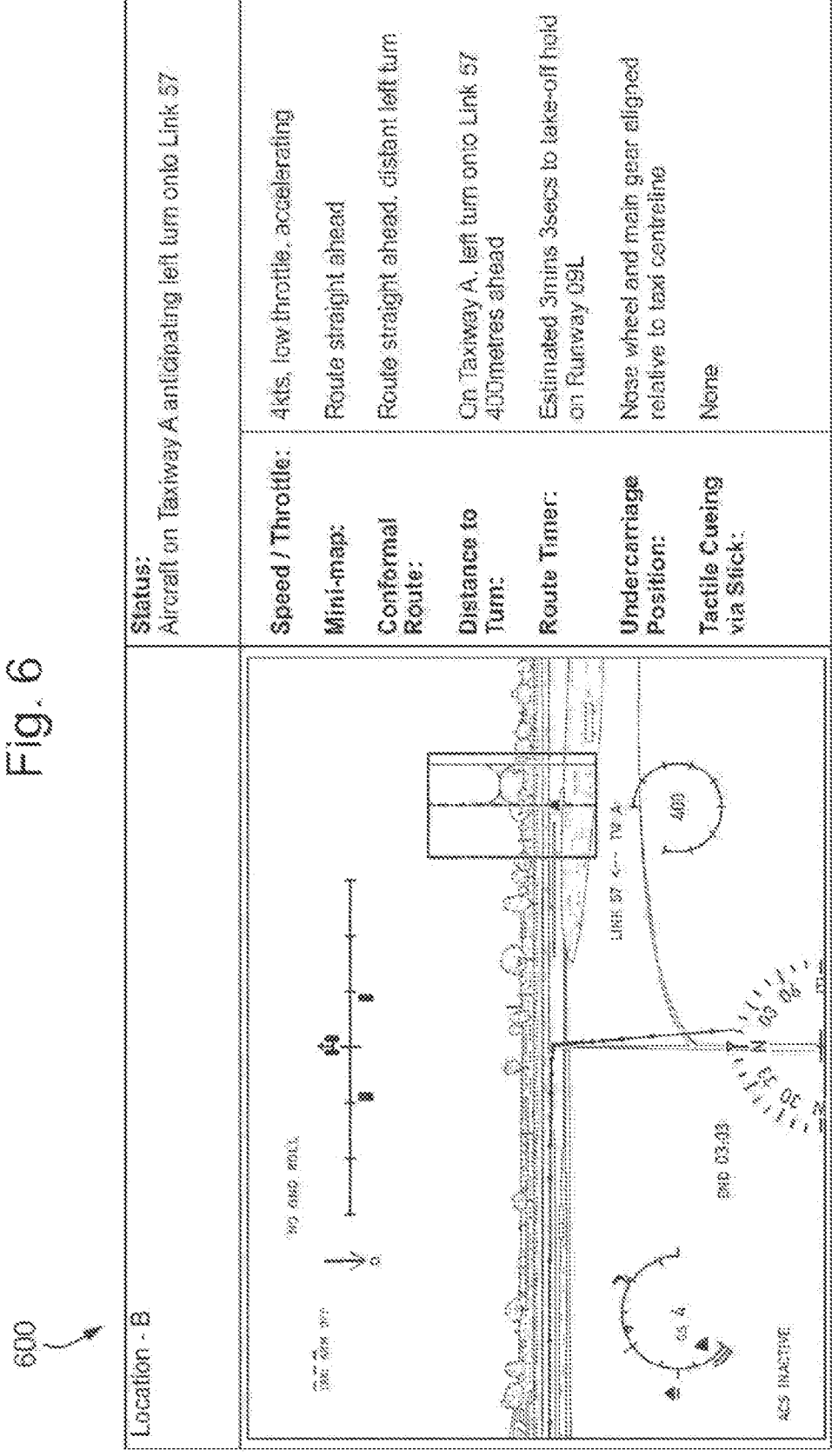

Location - B

Status:
Aircraft on Taxiway A anticipating left turn onto Link 57

| | |
|---|---|
| Speed / Throttle: | 4kts, low throttle, accelerating |
| Mini-map: | Route straight ahead |
| Conformal Route: | Route straight ahead, distant left turn |
| Distance to Turn: | On Taxiway A, left turn onto Link 57 400metres ahead |
| Route Timer: | Estimated 3mins 3secs to take-off hold on Runway 09L |
| Undercarriage Position: | Nose wheel and main gear aligned relative to taxi centreline |
| Tactile Cueing via Stick: | None |

Fig. 7

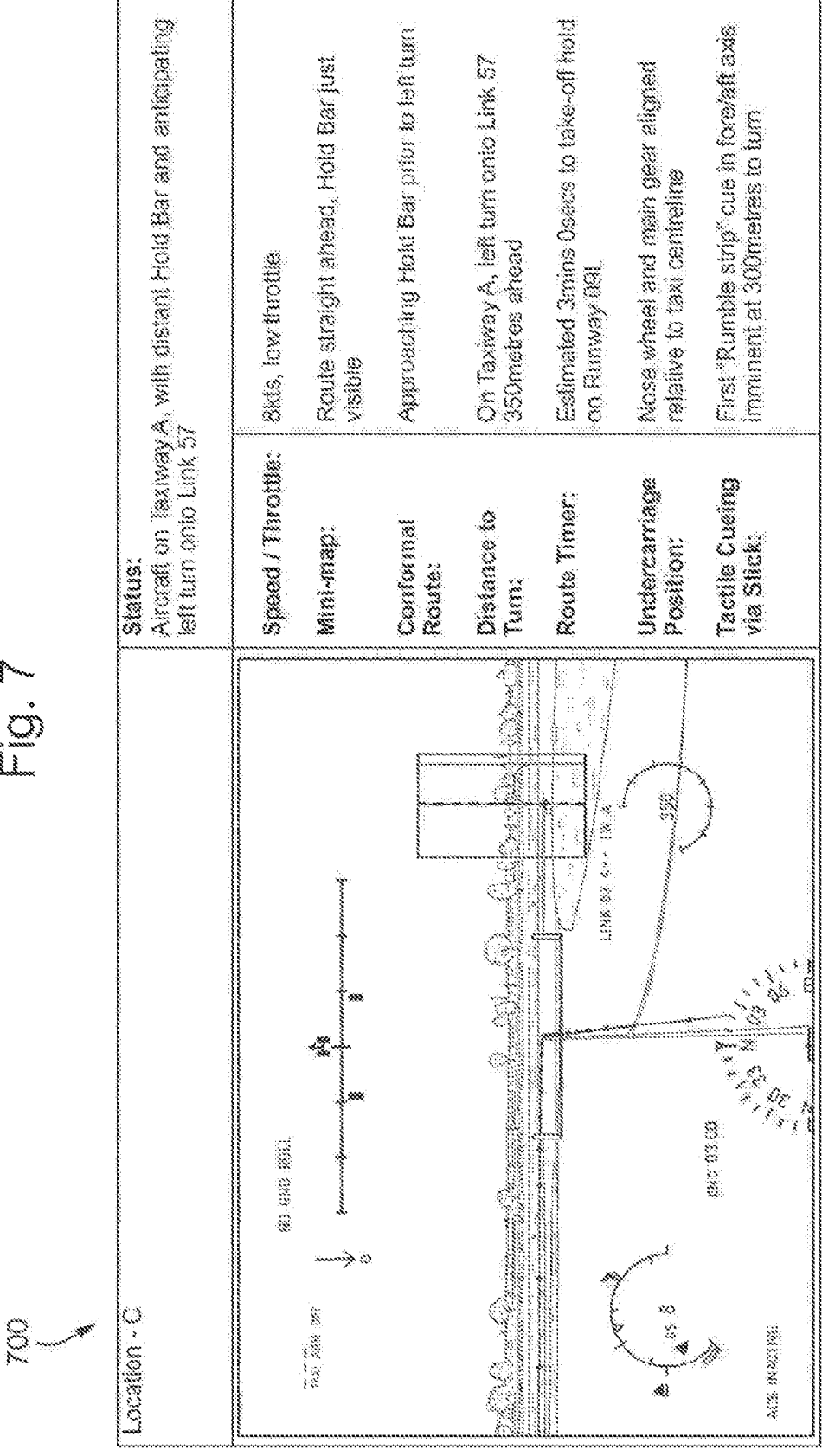

Location - C

700

| | |
|---|---|
| Status: | Aircraft on Taxiway A, with distant Hold Bar and anticipating left turn onto Link 57 |
| Speed / Throttle: | 8kts, low throttle |
| Mini-map: | Route straight ahead, Hold Bar just visible |
| Conformal Route: | Approaching Hold Bar prior to left turn |
| Distance to Turn: | On Taxiway A, left turn onto Link 57 350metres ahead |
| Route Timer: | Estimated 3mins 0secs to take-off hold on Runway 09L |
| Undercarriage Position: | Nose wheel and main gear aligned relative to taxi centreline |
| Tactile Cueing via Stick: | First "Rumble strip" cue in fore/aft axis imminent at 300metres to turn |

Figure 8:
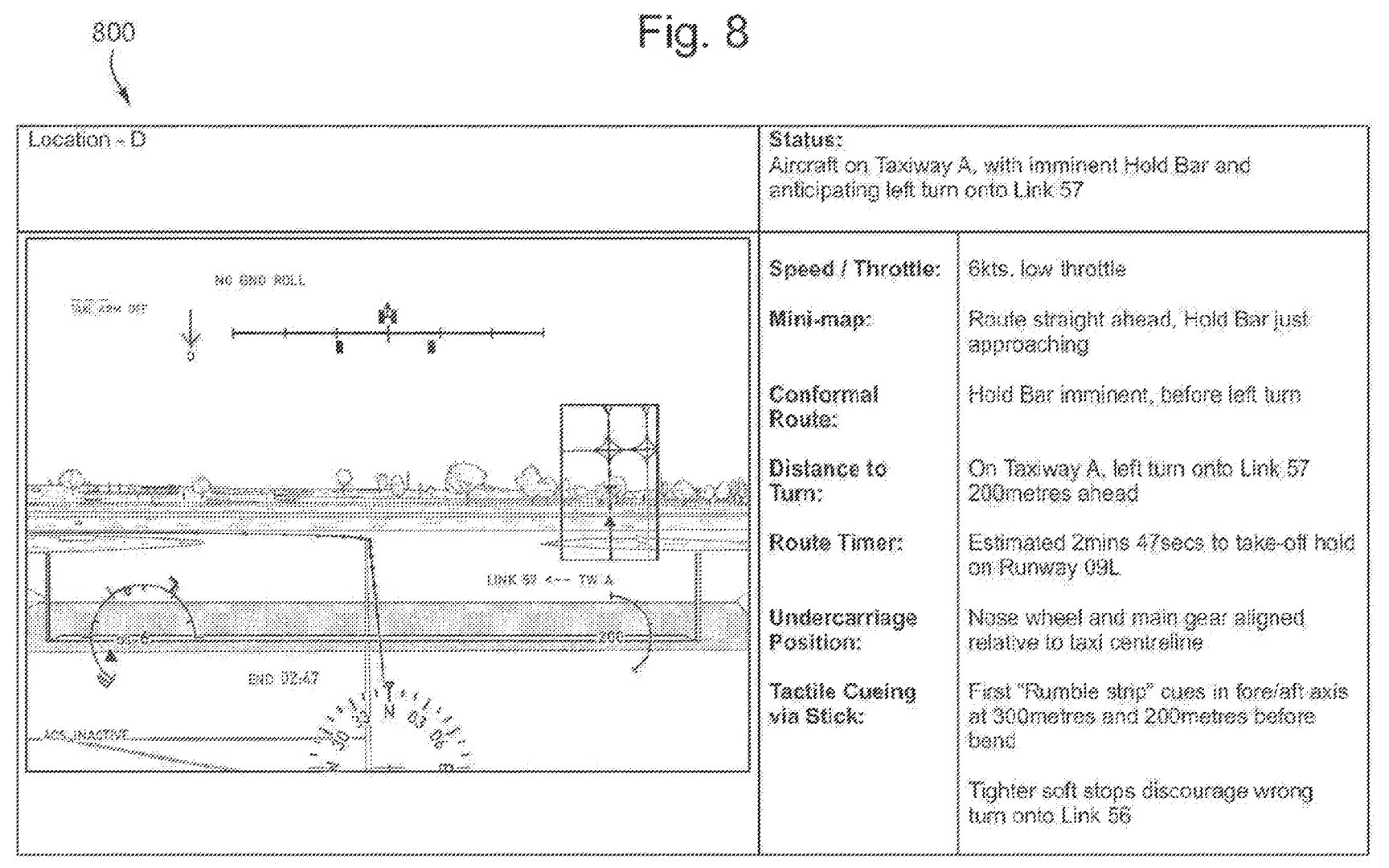

Location – D

Status:
Aircraft on Taxiway A, with imminent Hold Bar and anticipating left turn onto Link 57

| | |
|---|---|
| Speed / Throttle: | 6kts, low throttle |
| Mini-map: | Route straight ahead, Hold Bar just approaching |
| Conformal Route: | Hold Bar imminent, before left turn |
| Distance to Turn: | On Taxiway A, left turn onto Link 57 200metres ahead |
| Route Timer: | Estimated 2mins 47secs to take-off hold on Runway 03L |
| Undercarriage Position: | Nose wheel and main gear aligned relative to taxi centreline |
| Tactile Cueing via Stick: | First "Rumble strip" cues in fore/aft axis at 350metres and 200metres before band |
| | Tighter soft stops discourage wrong turn onto Link 56 |

Location – E

| Status:<br>Aircraft on Taxiway A, after leaving Hold Bar and anticipating imminent left turn onto Link 57 | |
|---|---|
| Speed / Throttle: | 20kts, low throttle |
| Mini-map: | Hold Bar behind, left turn ahead |
| Conformal Route: | Left turn ahead |
| Distance to Turn: | On Taxiway A, left turn onto Link 57 (10metres ahead |
| Route Timer: | Estimated 2mins 40secs to take-off hold on Runway 09L |
| Undercarriage Position: | Nose wheel and main gear aligned left of taxi centreline (right pointing arrowhead on left hand side of scale warns of main gear straying from centreline) |
| Tactile Cueing via Stick: | Brief 'Rumble strip' cue in fore/aft axis expected at 100metres before bend<br><br>Increased stick force gradient to discourage aggressive turn manoeuvre, hence reducing risk of tyre scrubbing |

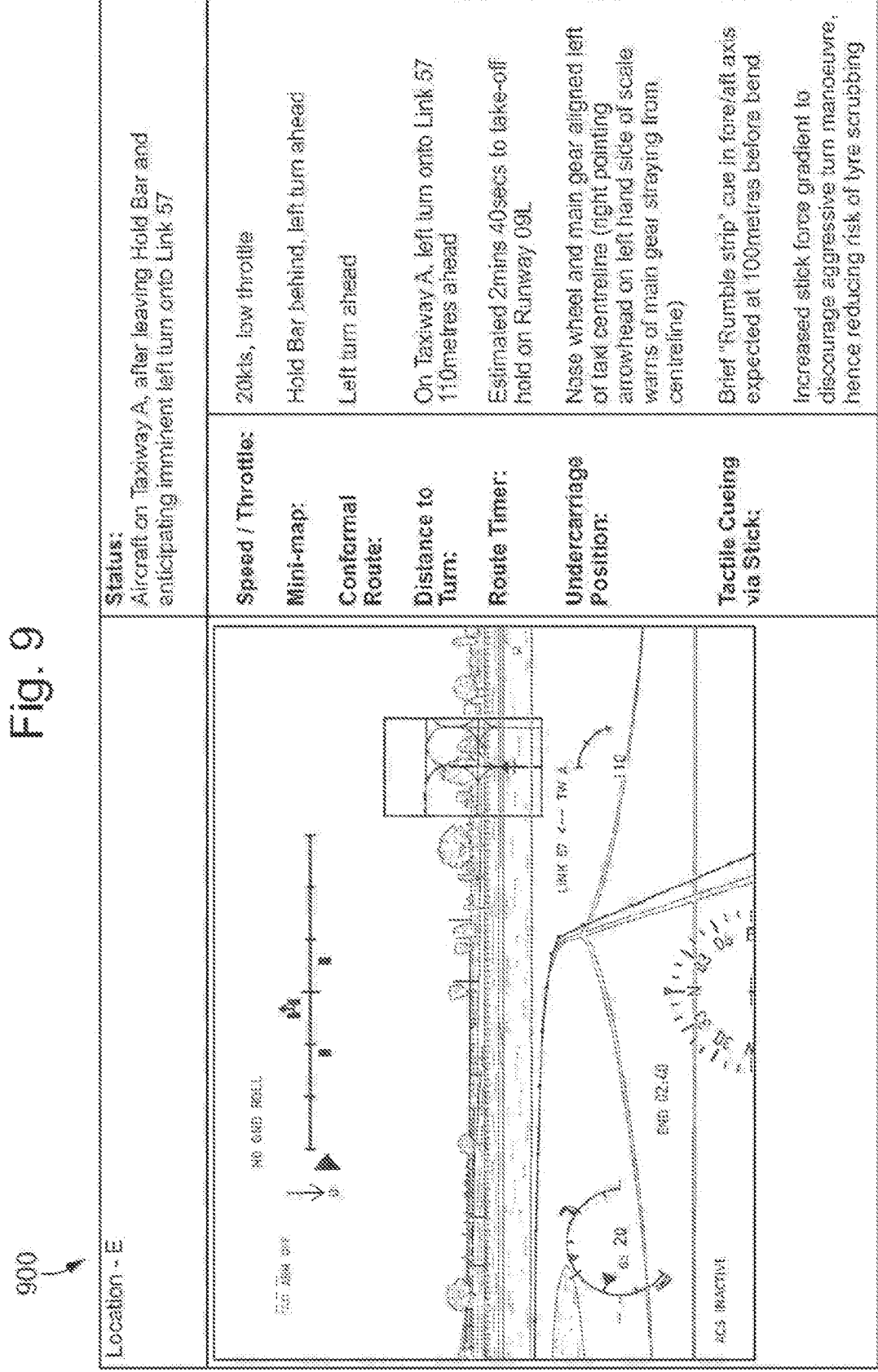

Location - F

| Status: | Aircraft established on Link 57, heading for take-off on Runway 09L via right hand bend A13 | |
| --- | --- | --- |
| Speed / Throttle: | 15kts, moderate throttle and high acceleration | |
| Mini-map: | Route straight ahead, having completed left hand turn | |
| Conformal Route: | Right turn ahead | |
| Distance to Turn: | Progressing along Link 57, with right hand turn ahead onto A13. Distance to turn 240 metres | |
| Route Timer: | Estimated 2mins 16secs to take-off hold on Runway 09L | |
| Undercarriage Position: | Nose wheel and main gear currently positioned left of centreline | |
| Tactile Cueing via Stick: | First "Rumble strip" cue in fore/aft axis occurred at 300m, with the next imminent at 200m before bend | |

Figure 11:
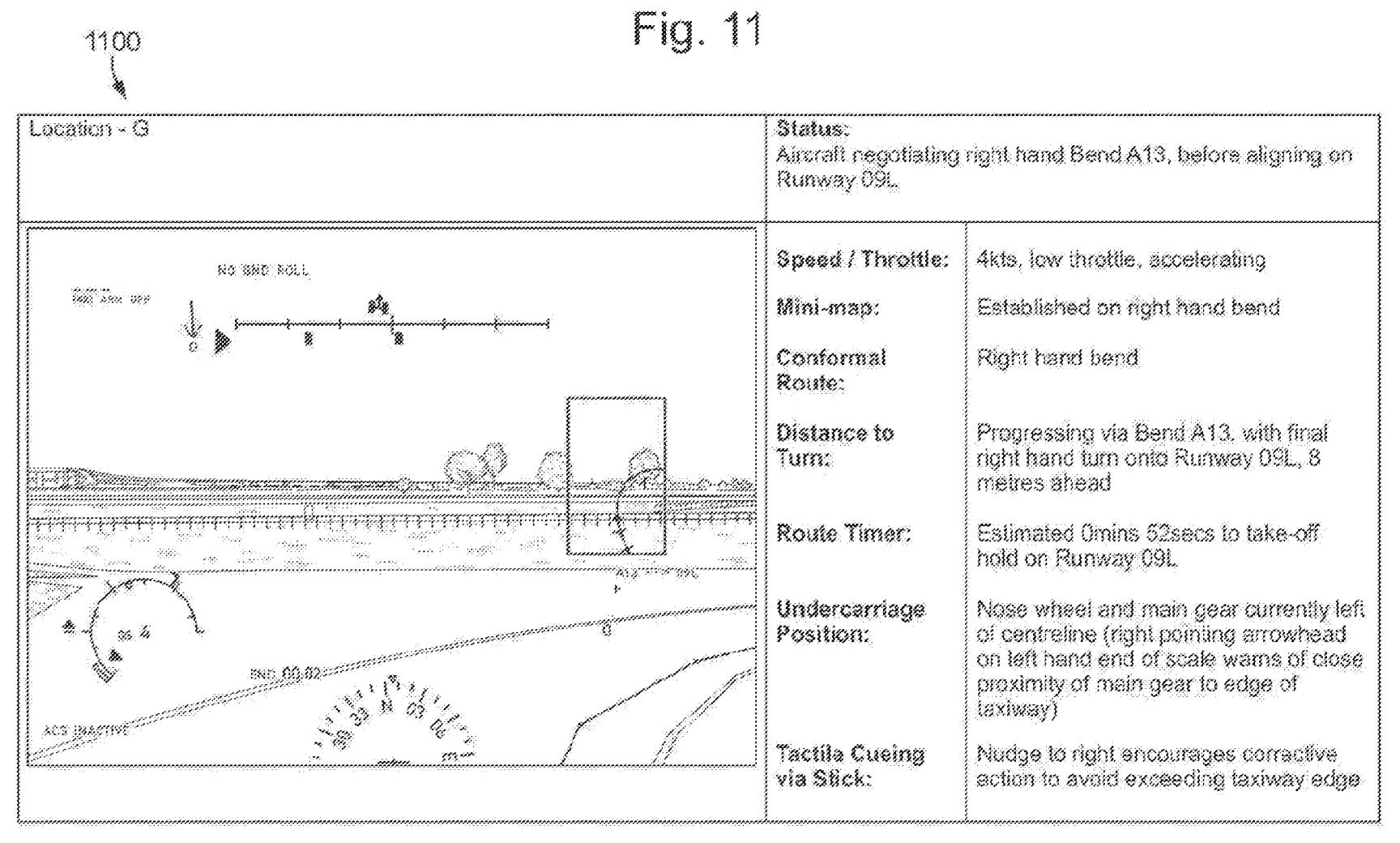

Location - G

Status:
Aircraft negotiating right hand Bend A13, before aligning on Runway 09L.

| | |
|---|---|
| Speed / Throttle: | 4kts, low throttle, accelerating |
| Mini-map: | Established on right hand bend |
| Conformal Route: | Right hand bend |
| Distance to Turn: | Progressing via Bend A13, with final right hand turn onto Runway 09L, 8 metres ahead |
| Route Timer: | Estimated 0mins 52secs to take-off hold on Runway 09L |
| Undercarriage Position: | Nose wheel and main gear currently left of centreline (right pointing arrowhead on left hand end of scale warns of close proximity of main gear to edge of taxiway) |
| Tactile Cueing via Stick: | Nudge to right encourages corrective action to avoid exceeding taxiway edge |

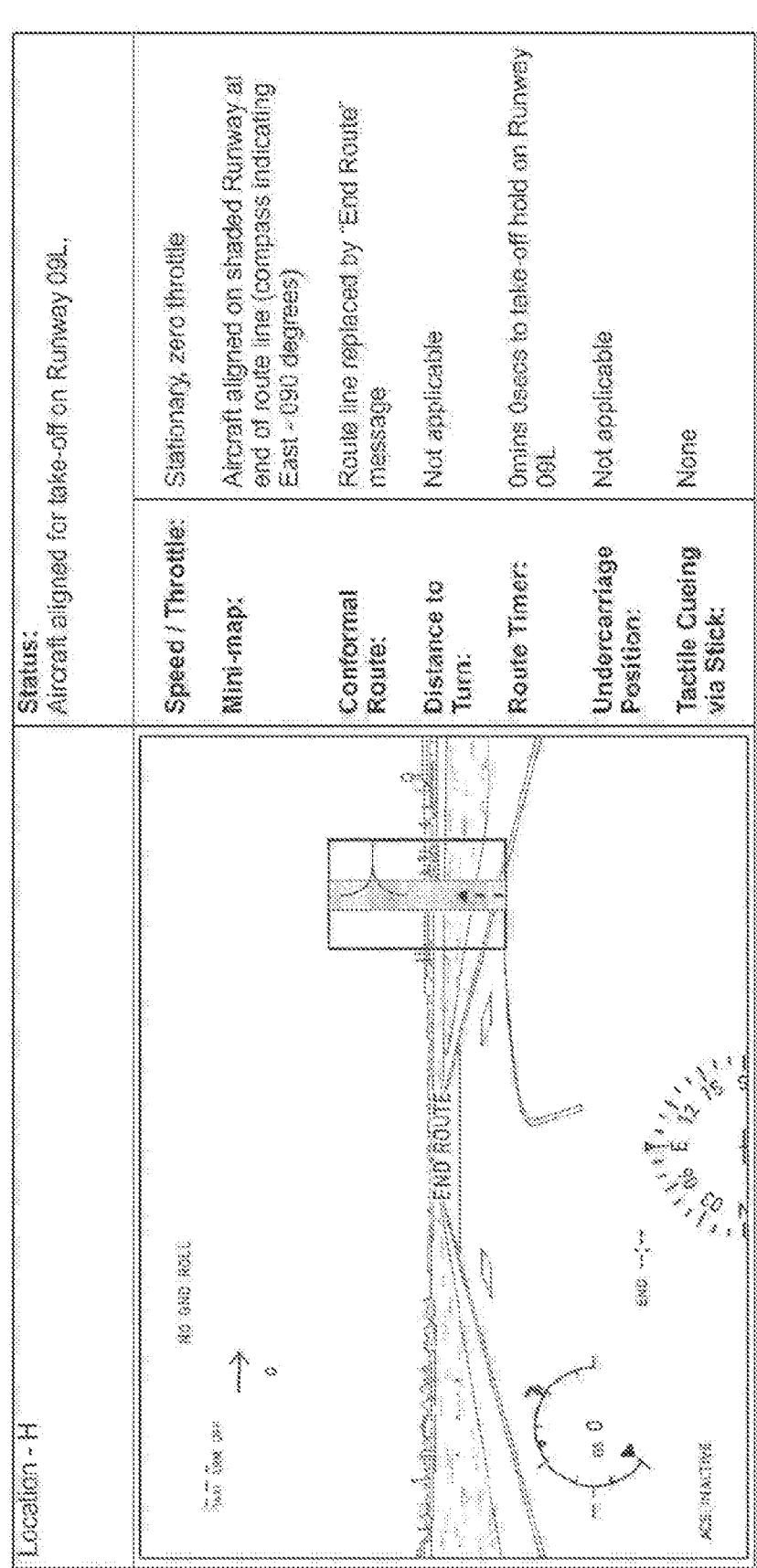

Location – H

Status:
Aircraft aligned for take-off on Runway 09L.

| | |
|---|---|
| Speed / Throttle: | Stationary, zero throttle |
| Mini-map: | Aircraft aligned on shaded Runway at end of route line (compass indicating East - 090 degrees) |
| Conformal Route: | Route line replaced by "End Route" message |
| Distance to Turn: | Not applicable |
| Route Timer: | 0mins 0secs to take-off hold on Runway 09L |
| Undercarriage Position: | Not applicable |
| Tactile Cueing via Stick: | None |

TAXIING METHOD AND APPARATUS

BACKGROUND

When taxiing at an airport, pilots should be aware of the air traffic control cleared route that they should take to get to their destination.

BRIEF DESCRIPTION OF DRAWINGS

FIG. 2 is an illustration of example information to display to a pilot on an eyes out screen.

FIGS. 5-12 illustrate possible views and information to be displayed at various features of interest.

DETAILED DESCRIPTION

When taxiing an aircraft at an airfield the flight crew should be aware of the route they are required to take. The route is often sent by air traffic control (ATC) to ensure that the aircraft avoids any hazards and to comply with the operation of the airport. However, there are many issues that aircrew face which may make taxiing along the route more difficult. For example complex runways and/or taxiway geometry may cause confusion for the pilot and increase the chance of errors, especially if the pilot has not been to the airfield before. Pilots may also have poor spatial awareness due to the limited view from the cockpit. This may be even more significant during low visibility operations such as foggy or snowy conditions. Furthermore, airports are also becoming increasingly busy due to the economic demands on airports to increase throughput.

Eyes out displays are displays where a user may view external (and internal) scenery through the display and also be presented with information on the display. An eyes out display may be mounted to the aircraft, such as a head up display (HUD), or other eyes out displays may be wearable by the user, such as a helmet mounted display (HMD).

In this disclosure methods have been identified that may reduce the workload of the aircrew, and therefore improve safety. The methods may also enable higher throughput of aircraft in airports, as the airport will be able to have smaller gaps between aircraft and less likely to be required to close. The methods may also improve fuel utilisation and long-term maintenance burden on aircraft.

Figure 1:
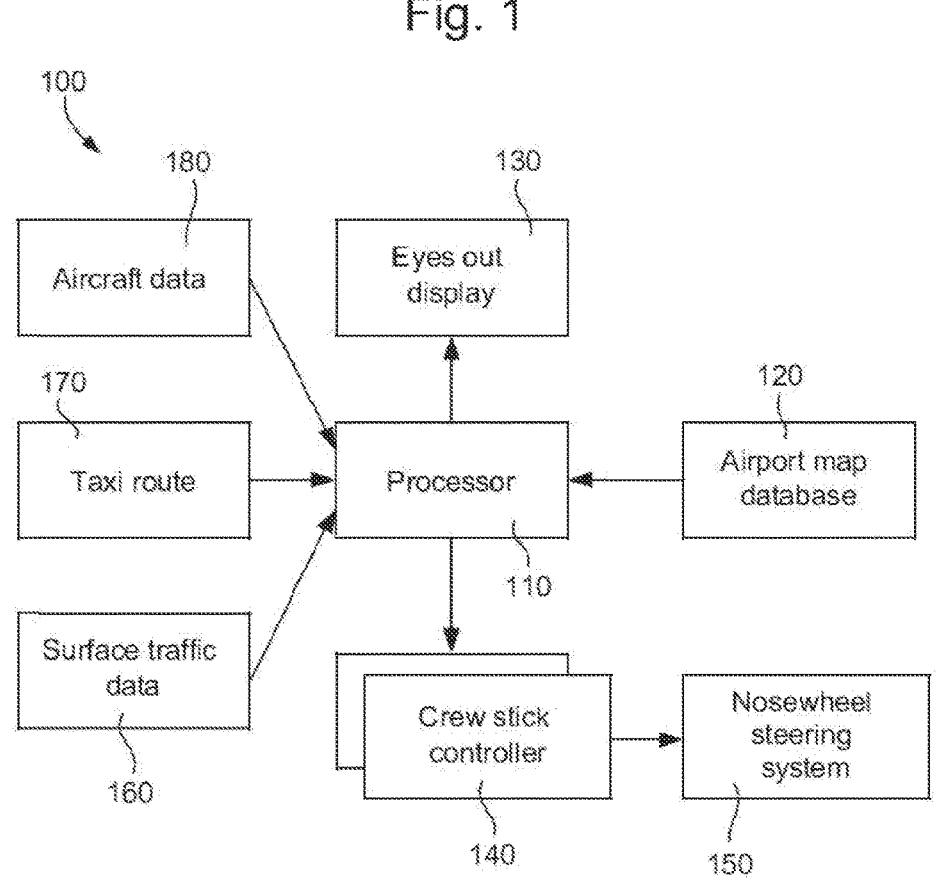
FIG. 1 is a flow chart illustrating a processor according to some examples.

A navigation system 100 is illustrated in FIG. 1. The navigation system comprises a processor 110. The processor is configured to receive as inputs: aircraft data 180, taxi route 170, surface traffic map 160 and airport map database 120. The processor 110 may process the inputs to output information to the eyes out display 130. The processor may also output instructions to the crew stick controller 140, which in turn may output instructions to the nosewheel steering system.

The output information comprises a centre line of the route. The centre line is conformal to outside scenery and is displayed on the eyes out screen. The centre line shows the route that the aircraft is instructed by the ATC to follow, the route provided by ATC. Displaying the route conformal to scenery and on the eyes out screen enables to pilot to observe the route without needing to look down at a separate screen, increasing the amount of time they may keep their concentration on the outside. The route may be continuously updated to reflect the progress of the aircraft. The conformal route may provide particular benefit at complex junctions or under poor visual conditions.

The output information also comprises a pictorial indication of the alignment of the undercarriage with the centre line displayed to the pilot on the eyes out screen. The pictorial indication allows the pilot to immediately observe the alignment without further processing, which may allow the pilot or other flight crew to quickly ascertain whether they are following or will follow the route correctly, and make any appropriate corrections if they are not. This feature of the symbology also allows the pilot to assess the proximity of the undercarriage to the edge of the paved area and would offer particular benefit when steering a wide arc to complete a tight turn, for example.

The output information also comprises further graphical information displayed to the pilot. The further graphical information is related to the navigation of the aircraft. Some examples of further graphical information are described with relation to FIG. 2.

In some examples the navigation system 100 may detect if an active stick is being used to control nosewheel steering. In some examples the navigation system 100 may assume that the active stick is being used to control nosewheel steering. In some examples a user may designate whether an active stick is used to control nosewheel steering. An active stick is a type of user input device that may be able to provide force feedback to a user with a predetermined characteristic.

Figure 2:
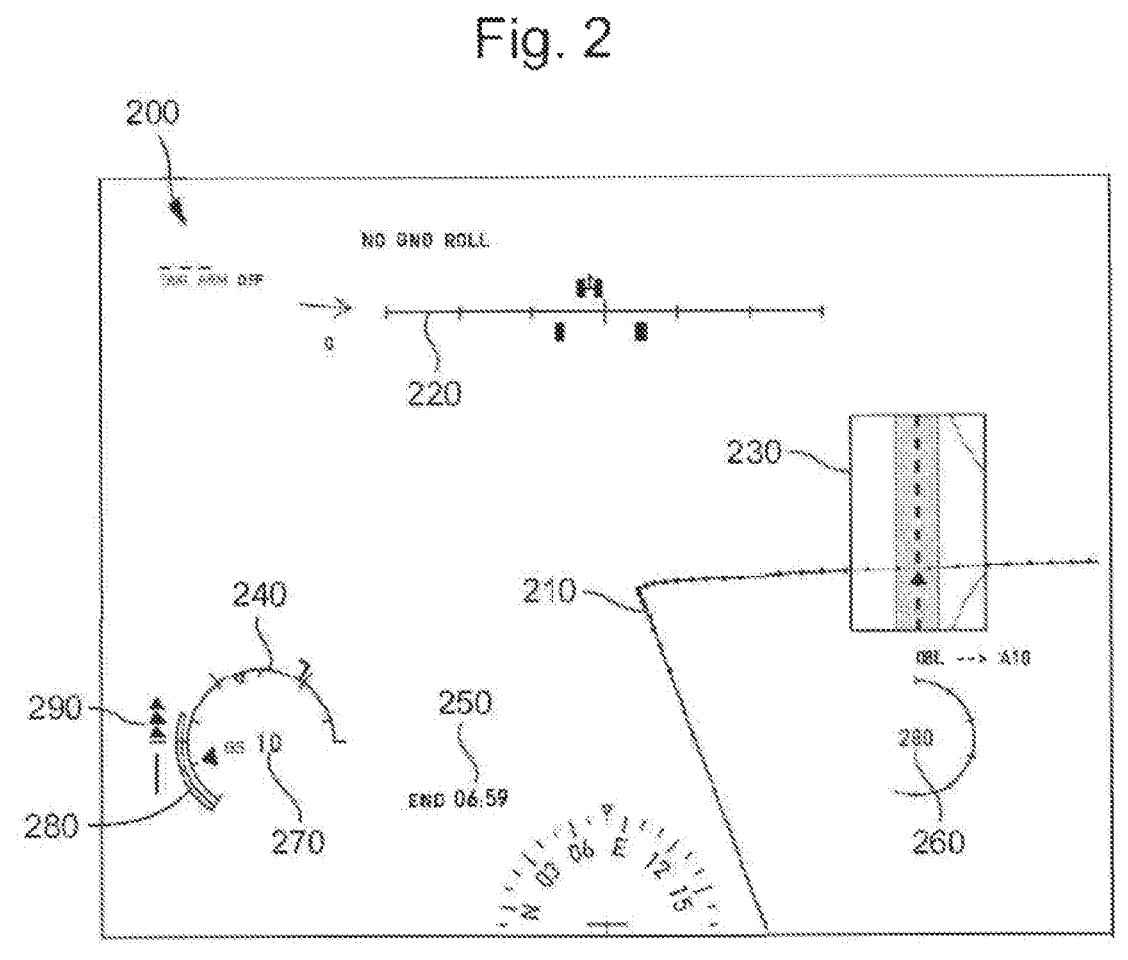

FIG. 2 shows an example content that may be displayed on an eyes out screen 200. The eyes out screen comprises a conformal route 210 and undercarriage alignment indicator 220. The eyes out screen also comprises further graphical information including a mini map 230, speed/throttle indicator 240, time to destination indicator 250, distance to turn indicator 260, groundspeed indicator, throttle setting indicator 280 and acceleration indicator 290.

Conformal route 210 displays the route the ATC has assigned to the aircraft onto the eyes out screen, such that it is conformal to scenery. As shown in FIG. 2, conformal route 210 indicates that there is an impending turn.

Undercarriage alignment indicator 220 shows the alignment of the undercarriage with the conformal route 210. In some examples a tactile output may be received if the alignment of the undercarriage deviates from the route over a predetermined threshold. This may help guide the plane back to the correct route, but at the same time allow the pilot to go off the route if the situation requires, for example if the pilot has to avoid a hazard not reflected in the conformal route 210. In some examples the tactile output may be received via an active stick rather than a tiller. A tactile output may guide the pilot back to the correct path without being too obtrusive to the pilot. The active stick may be similar to the active stick as described in patent application GB 1721529.4 (publication number GB2569601), which is hereby incorporated by reference.

The undercarriage alignment indicator may indicate the alignment of the front gear, or the front gear and the rear gear with the centre line. In some examples the undercarriage alignment indicator 220 may indicate the position relative to the centre line and the direction the gear are pointing in for the front gear and/or the front gear and the rear gear.

Mini map 230 shows a map of the airport, along with an indication of where the aircraft is located on the airport. The map may be updated based on the aircrafts position. In some examples the map may be centred on the aircraft such that the aircraft maintains at a fixed position on the map.

Speed/throttle indicator 240 may show the current throttle output power of the engine or engines of the aircraft. Groundspeed indicator 270 may indicate the groundspeed of the aircraft. Throttle setting indicator 280 may indicate the current throttle setting of the aircraft. Acceleration indicator 290 may indicate the current acceleration of the aircraft. Acceleration may be negative indicating that the aircraft is deaccelerating.

Time to destination indicator 250 may indicate an estimated time to the destination of the aircraft based on the assigned route and current and predicted speed of the aircraft. The predicated speed may be based on the typical speeds through the airport for the current conditions.

Distance to turn indicator 260 may indicate the distance to the next turn. It may comprise a numerical indicator and/or a graphical indicator. In some examples the distance to turn indicator 260 may be displayed when the distance to the next turn is below a threshold distance, and may not be displayed when the distance to the turn is above the threshold distance. When the distance to turn is not displayed this may indicate to the pilot that the distance to the next turn is more than a threshold distance.

In some examples the eyes out display 200 may also comprise warnings if a particular measure is over (or under) a threshold. For example a speed warning may be displayed if the speed is over a threshold value. A throttle warning may be displayed if the throttle setting is over a threshold value. A traffic warning indicator may be displayed if the distance to traffic is below a threshold distance from the aircraft and/or predicted to be within a threshold distance along the predicted route of the aircraft. A time warning may be displayed if the aircraft is ahead or behind schedule by a predetermined amount. A warning may also be displayed if the aircraft is within a threshold distance of a hazard.

The features displayed in FIG. 2 are exemplary, and may be displayed in any arrangement or combination of features. Furthermore, it is not an exhaustive list and other features or indicators may be displayed.

Figure 3:
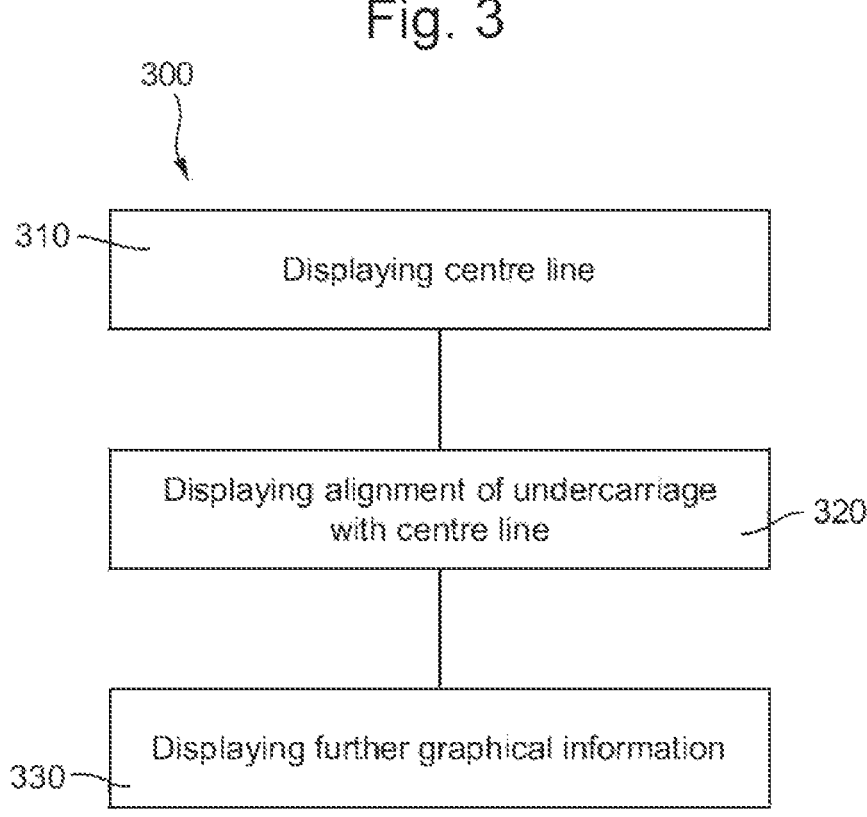
FIG. 3 is a flow chart illustrating a method according to some examples.

FIG. 3 illustrates a method 300 in accordance with some examples. The method comprises displaying a centre line of a route 310, the route conformal to outside scenery, on an eyes out screen associated with the pilot. Displaying, on the eyes out screen, a pictorial indication of the alignment of the undercarriage with the centre line 320; and displaying, on the eyes out screen, further graphical information related to the navigation 330, the type of graphical information is based on at least one of the speed and location of the aircraft.

In some examples the method 300 may further comprise displaying a speed indicator. In some examples the speed indicator may display a warning if the speed is over a threshold value.

In some examples the method may further comprise displaying a throttle setting indicator. In some examples the throttle setting indicator may display a warning if throttle power and/or setting is over a threshold power.

In some examples the method may further comprise displaying a traffic indicator. In some examples the traffic indicator may display a warning if traffic is within a threshold distance from the positon of the aircraft or predicted to be within a threshold distance from the aircraft along the route.

In some examples the method may further comprise displaying a time indicator, indicating the time to a destination, or estimated time of arrival to the destination. In some examples the time indicator may display a warning if the aircraft is ahead or behind schedule. The schedule may be set by the ATC or by the aircrew.

In some examples displaying the centre line further comprises displaying mandatory stop bars. This may allow the pilot to be aware of the location of the stop bars even if the physical stop bar is not visible or obscured.

In some examples the method may further comprise providing a tactile feedback to the pilot based on a deviation from the centre line route or when the undercarriage is becoming close to edge of the paved area. In some examples, when the nosewheel steering is controlled by an active stick rather than a tiller, the tactile feedback may be provided to the pilots hand via the active stick.

In some examples the tactile feedback may comprise a variable stick feel dependent upon the deviation from the intended path. This may comprise requiring more force to move the stick to a position that would deviate the aircraft from the path compared to a movement that would keep the aircraft on the path.

In some examples the tactile feedback may comprise a progressive stick force and/or soft stop. This may be based on groundspeed, such that tyre scrubbing and nosewheel gear wear is reduced.

In some examples the tactile feedback may comprise a rumble strip and/or nudges to identify imminent turns and to discourage wrong turns.

In some examples the tactile feedback may comprise overspeed cues, such as a simulated rumble strip, which would aid speed awareness.

The tactile feedback described above may be used in any combination. Furthermore, tactile feedback may be used in conjunction with visual symbology or aural cues as described below. Combing tactile feedback and eyes-out visual symbology may enhance situational awareness of the pilot, promoting accurate, safe and timely execution of the taxi task, with the potential of reducing maintenance burden.

In some examples rumble strip cues can also be programmed to occur at distances from a hazard based on multiples of the length of the aircraft, thereby providing a means of scaling across different aircraft applications In some examples a symbol may flash so as to synchronise with a particular tactile cue, such as a nudge. This may reinforce the alert. An aural alert could also synchronise with the tactile cue. This may encourage the pilot to focus on the eyes-out display, increasing the safety of the aircraft and reducing chance of accidents or errors.

In some examples a symbol may be displayed on the eyes out screen if one of the gear are within a threshold distance of an edge of the taxiway or runway. The symbol may be accompanied with an aural alert and/or a tactile alert. The tactile alert may be different from a tactile alert to indicate that the gear is not aligned with the centre line, or may have an increased severity, for example a stronger nudge may be provided or a steeper force gradient.

In some examples the undercarriage alignment indicator and graphical information may appear automatically when the aircraft is taxiing. This may be based on a sensing of the current speed and location of the aircraft. In some examples the undercarriage alignment indicator and graphical information may cease to be displayed when the aircraft reaches the destination on the runway. In some examples the pilot may be able to toggle the undercarriage alignment indicator and graphical information on and off, and also may be able to override any automatic settings of the undercarriage alignment indicator and graphical information.

Figure 4B:
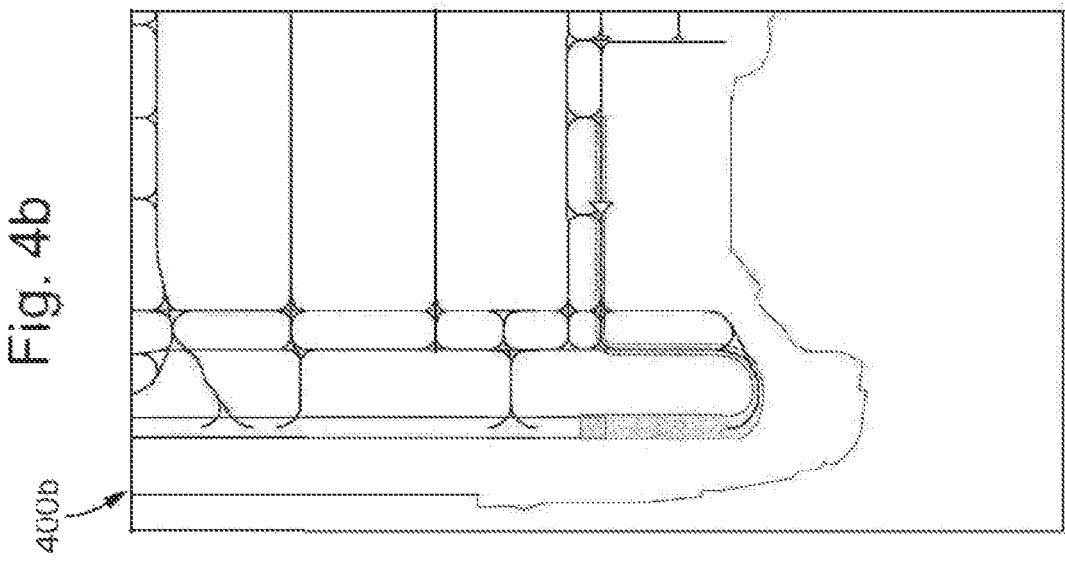
FIG. 4b illustrates a map of an airfield.
Figure 4A:
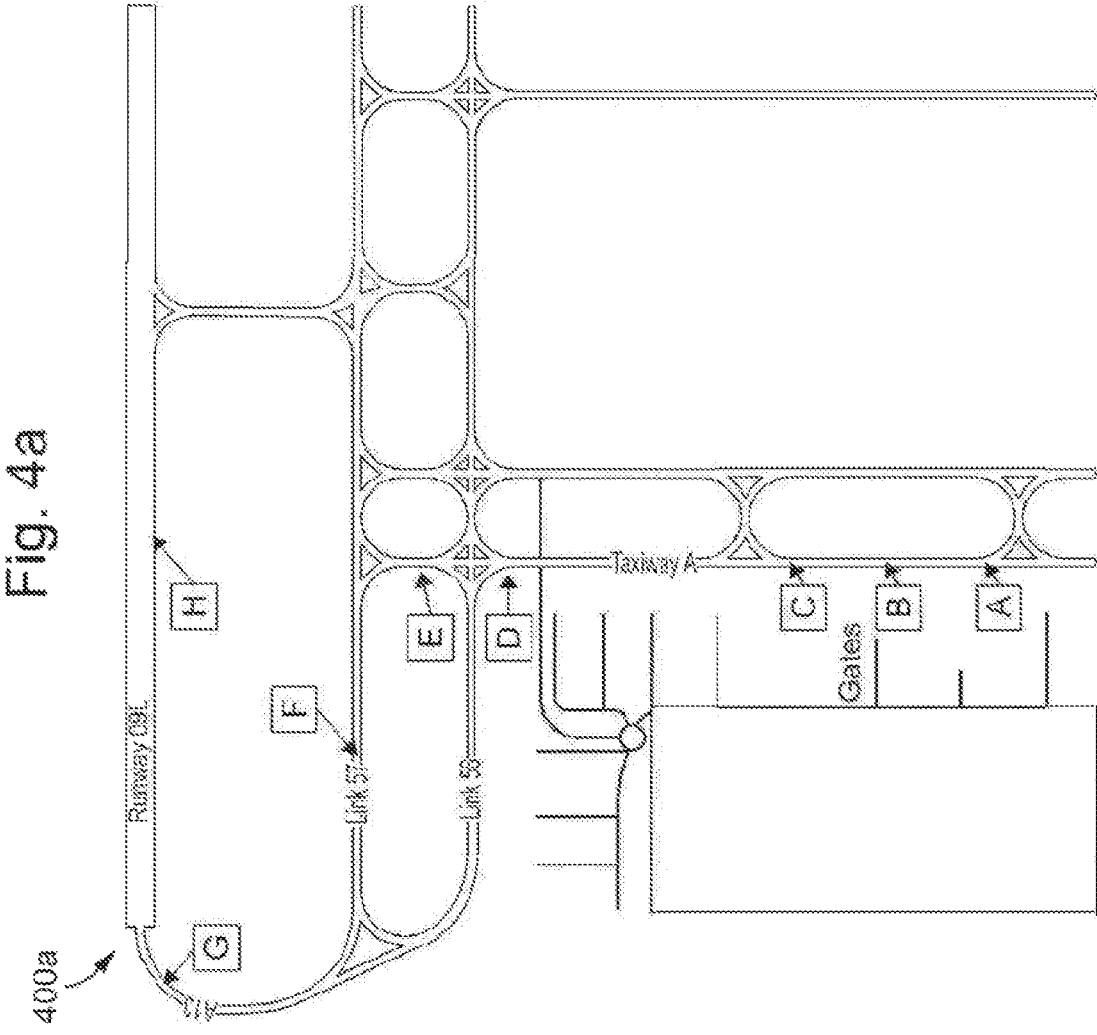
FIG. 4a illustrates potential features of interest on an airfield.

Further examples for visual displays on the eyes out screen are illustrated in FIGS. 4a, 4b, 5-12. FIG. 4a illustrates a map 400a of an airport comprising a runway, taxiway, link and bend. The scenario may be that ATC has authorised a route, illustrated on map 400a, that commences after pushback from the gate. The route heads towards the take-off hold on runway 09L via taxiway A, link 57 and bend A13. The pilot may control the nosewheel steering via an active stick rather than a tiller. Guidance may be provided to the pilot during the route, and specifically at various locations A-H along the route, as illustrated in FIGS. 5-12. Each of the views comprises a conformal route, a nosewheel alignment indicator, a mini map, a speed/throttle indicator and a bearing/heading indicator. It is also noted that the distances described with relation to locations A-H are merely exemplary, and any suitable combination of distances could be used.

At location A, as illustrated by FIG. 5, a first view 500 is presented to the pilot on the eyes out screen. At location A the plane is travelling at 9 knots, with low throttle and is accelerating. This is indicated by speed/throttle indicator in the lower left hand corner of the view. The route indicated on the mini map shows the route to be straight ahead. Conformal route indicator shows the route to be straight ahead with a distant left turn ahead.

A distance to turn indicator may indicates that there is more than 500 m to the next turn. The absence of the distance to turn indicator indicates that the turn is more than 500 m away. The route timer shows that there is an estimated 3 minutes 12 seconds to take off hold on runway 09L. There is no tactile cueing at least because both the nosewheel and main gear are aligned to the route.

At location B, as illustrated by FIG. 6, a second view 600 is presented to the pilot on the eyes out screen. At location B the plane is travelling at 4 knots, with low throttle and is accelerating. This is indicated by speed/throttle indicator in the lower left hand corner of the view. The route indicated on the mini map shows the route to be straight ahead. Conformal route indicator shows the route to be straight ahead with a distant left turn ahead.

A distance to turn indicator indicates that there is 400 m to the next turn. The route timer shows that there is an estimated 3 minutes 3 seconds to take off hold on runway 09L. There is no tactile cueing at least because both the nosewheel and main gear are aligned to the route.

At location C, as illustrated by FIG. 7, a third view 700 is presented to the pilot on the eyes out screen. At location C the plane is travelling at 8 knots, with low throttle and is not accelerating. This is indicated by speed/throttle indicator in the lower left hand corner of the view. The route indicated on the mini map shows that the route is straight ahead, and there is a hold bar just visible prior to the left turn. Conformal route indicator shows the route to be straight ahead with a hold bar prior to the left turn.

A distance to turn indicator indicates that there is 350 m to the next turn. The route timer shows that there is an estimated 3 minutes 0 seconds to take off hold on runway 09L. A tactile cue in the form of a simulated rumble strip is imminent in the fore/aft axis of the active stick. In some examples the rumble strip could be provided at 300 m prior to the turn.

At location D, as illustrated by FIG. 8, a fourth view 800 is presented to the pilot on the eyes out screen. At location D the plane is travelling at 6 knots, with low throttle and is not accelerating. This is indicated by speed/throttle indicator in the lower left hand corner of the view. The route indicated on the mini map shows that the route is straight ahead, and there is a hold bar approaching prior to the left turn. Conformal route indicator shows that a hold bar is imminent prior to the left turn.

A distance to turn indicator indicates that there is 200 m to the next turn. The route timer shows that there is an estimated 2 minutes 47 seconds to take off hold on runway 09L. A tactile cue in the form of a simulated rumble strip is provided in the fore/aft axis of the active stick at 200 m and 300 m prior to the turn. Soft stops in the active stick may be used to discourage a turn in the wrong direction. Alternatively and/or additionally nudges may be applied in the direction of the correction that should be applied to realign the aircraft onto the route.

At location E, as illustrated by FIG. 9, a fifth view 900 is presented to the pilot on the eyes out screen. At location E the plane is travelling at 20 knots, with low throttle and is not accelerating. This is indicated by speed/throttle indicator in the lower left hand corner of the view. The route indicated on the mini map shows that the hold bar is behind and the left turn is ahead. Conformal route indicator shows that the left turn is ahead. A right pointing arrow is shown on the left hand side of the gear alignment indicator, which indicates that the gear is close to the edge of the taxiway, and the correct direction to move the gear towards.

A distance to turn indicator indicates that there is 110 m to the next turn. The route timer shows that there is an estimated 2 minutes 40 seconds to take off hold on runway 09L. A tactile cue in the form of a simulated rumble strip is provided in the fore/aft axis of the active stick at 100 m prior to the turn. An increased active stick force gradient discourages an aggressive turn manoeuvre, which may decrease the chance of tyre scrubbing. Soft stops in the active stick may be used to discourage a turn in the wrong direction. Alternatively and/or additionally nudges may be applied in the direction of the correction that should be applied to realign the aircraft onto the route.

As the nosewheel and main gear are aligned left of the taxi centreline a right pointing arrow is displayed on the alignment indicator, showing the direction required to realign with the route.

At location F, as illustrated by FIG. 10, a sixth view 1000 is presented to the pilot on the eyes out screen. At location F the plane is travelling at 15 knots, with moderate throttle and high acceleration accelerating. This is indicated by speed/throttle indicator in the lower left hand corner of the view. The route indicated on the mini map shows that the left turn has been completed and the route is straight ahead. Conformal route indicator shows that there is a right turn ahead.

A distance to turn indicator indicates that there is 240 m to the next turn. The route timer shows that there is an estimated 2 minutes 16 seconds to take off hold on runway 09L. A tactile cue in the form of a simulated rumble strip is provided in the fore/aft axis of the active stick at 300 m and 200 m prior to the turn. As the nosewheel and main gear are aligned left of the taxi centreline a right pointing arrow is displayed on the alignment indicator, showing the direction required to realign with the route.

At location G, as illustrated by FIG. 11, a seventh view 1100 is presented to the pilot on the eyes out screen. At location G the plane is travelling at 4 knots, with low throttle and accelerating. This is indicated by speed/throttle indicator in the lower left hand corner of the view. The route indicated on the mini map shows that the aircraft is navigating a right hand turn. Conformal route indicator shows that the plane is on the right hand turn.

A distance to turn indicator indicates that the plane is on the turn. The route timer shows that there is an estimated 52 seconds to take off hold on runway 09L. The undercarriage indicator shows that the nose wheel and main gear are left of the centre line. The right pointing arrow on the left of the scale indicates the proximity with the edge of the taxi way. A tactile cue in the form of a nudge is applied to the stick. The nudge encourages the pilot to move in the direction that takes the main gear away from the edge of the taxiway.

At location H, as illustrated by FIG. 12, an eighth view 1200 is presented to the pilot on the eyes out screen. At location H the plane is stationary with zero throttle and is not accelerating. This is indicated by speed/throttle indicator in the lower left hand corner of the view. The route indicated on the mini map shows that the aircraft is aligned with the runway at the end of the route line. Conformal route indicator shows that the plane is at the end of the route.

The distance to turn indicator is no longer applicable. The route timer shows that there is an estimated 0 seconds to take off hold on runway 09L. The undercarriage indicator is no longer applicable. In some examples the undercarriage alignment indicator may remain visible, allowing the pilot to check that the undercarriage is in the correct alignment. In some examples the undercarriage alignment indicator may remain visible for a predetermined time at the destination, or a predetermined distance from the destination. In some examples the undercarriage alignment indicator may remain visible until the throttle reaches a predetermined power setting, or when the pilot turns off the taxing system.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A method for assisting a pilot to navigate an aircraft when taxiing, the method comprising:

displaying, conformal to outside scenery, a centre line of a route assigned to the aircraft on an eyes out screen associated with the pilot;

displaying, on the eyes out screen, a pictorial indication of an alignment of an undercarriage of the aircraft with the centre line and a stop or hold bar;

displaying, on the eyes out screen, graphical information related to navigation of the aircraft, the graphical information comprising (i) a speed indicator, (ii) a throttle indicator, (iii) an acceleration indicator, and (iv) a bearing/heading indicator; and providing, via an active stick, a variable tactile feedback to the pilot based on a deviation of the alignment of the undercarriage of the aircraft from the route assigned to the aircraft, the variable tactile feedback requiring more force to move the active stick to a position that would deviate the undercarriage of the aircraft from the route compared to a movement of the active stick that would keep the undercarriage of the aircraft on the route.

2. The method according to claim 1, wherein the graphical information further comprises at least one of: a distance to turn indicator, a traffic indicator, or a time indicator, wherein the time indicator comprises at least one of an indication of time remaining to a destination of the aircraft, or an indication of the estimated time of arrival to the destination of the aircraft.

3. The method according to claim 1, comprising displaying, on the eyes out screen, a warning in response to at least one measure being more or less than a threshold, wherein the at least one measure includes one or more of a speed, a power setting, a distance to turn, and/or distance to traffic.

4. The method according claim 1, wherein displaying the centre line includes displaying mandatory stop bars.

5. The method according to claim 1, wherein the variable tactile feedback is in a direction that would correct the deviation and provided to the active stick used to steer a nosewheel.

6. The method according to claim 1, wherein the variable tactile feedback comprises a nudge.

7. The method according to claim 1, wherein the variable tactile feedback is synchronized with one or both of (1) a visual indication based on the deviation from the centre line route and (2) an aural indication based on the deviation from the centre line route.

8. A non-transitory computer readable storage medium comprising instructions, that when executed by one or more processors, cause a process to be carried out for assisting a pilot to navigate an aircraft when taxiing, the process comprising:

causing display of, conformal to outside scenery, a centre line of a route on an eyes out screen associated with the pilot;

causing display of, on the eyes out screen, a pictorial indication of an alignment of an undercarriage of the aircraft with the centre line and a stop or hold bar;

causing display of, on the eyes out screen, graphical information related to navigation of the aircraft, the graphical information comprising a throttle indicator and an overhead map showing at least the route assigned to the aircraft, the position of the aircraft, and the stop or hold bar; and providing, via an active stick, a variable tactile feedback to the pilot based on a deviation of the alignment of the undercarriage of the aircraft from a path, the variable tactile feedback requiring more force to move the active stick to a position that would deviate the undercarriage of the aircraft from the path compared to a movement of the active stick that would keep the undercarriage of the aircraft on the path.

9. A navigation system comprising a processor, an eyes out screen operatively coupled to the processor, and an active stick operatively coupled to the processor, the processor configured to assist a pilot to navigate an aircraft when taxiing, by causing:

display of, conformal to outside scenery, a centre line of a route on the eyes out screen associated with the pilot;

display of, on the eyes out screen, a pictorial indication of an alignment of an undercarriage of the aircraft with the centre line and a stop or hold bar;

display of, on the eyes out screen, graphical information related to navigation of the aircraft, the graphical information comprising an overhead map showing at least the route assigned to the aircraft, the position of the aircraft, and the stop or hold bar, the graphical information further comprising at least one of (i) a speed indicator, (ii) a throttle indicator, (iii) an acceleration indicator, and (iv) a bearing/heading indicator; and a variable tactile feedback to the pilot via an active stick based on a deviation of the alignment of the undercarriage of the aircraft from a path, the variable tactile feedback requiring more force to move the active stick to a position that would deviate the undercarriage of the aircraft from the path compared to a movement of the active stick that would keep the undercarriage of the aircraft on the path.

10. The system according to claim 9, wherein the variable tactile feedback is provided to the active stick used to steer a nosewheel and in a direction that would correct the deviation.

11. The system according to claim 10, wherein the variable tactile feedback comprises a nudge.

12. The system according to claim 9, wherein the variable tactile feedback is synchronized with one or both of (1) a visual indication based on the deviation from the centre line route and (2) an aural indication based on the deviation from the centre line route.

13. The system according to claim 11, wherein the graphical information related to the navigation includes any one or more of: an aircraft location indicator, a time to destination indicator, a distance to turn indicator, and a groundspeed indicator.

14. The non-transitory computer readable storage medium according to claim 8, wherein the variable tactile feedback is provided to the active stick used to steer a nosewheel and in a direction that would correct the deviation.

15. The non-transitory computer readable storage medium according to claim 8, wherein the variable tactile feedback is synchronized with one or both of (1) a visual indication based on the deviation from the centre line route and (2) an aural indication based on the deviation from the centre line route.

16. The non-transitory computer readable storage medium according to claim 8, wherein the graphical information related to the navigation includes any one or more of: an aircraft location indicator, a time to destination indicator, a distance to turn indicator, and a groundspeed indicator.

* * * * *